United States Patent
Reed-Weidner et al.

(10) Patent No.: US 12,370,687 B2
(45) Date of Patent: Jul. 29, 2025

(54) SYSTEMS AND METHODS FOR GENERATING SAFETY ZONES FOR AUTONOMOUS MOBILE ROBOTS

(71) Applicant: OMRON Corporation, Kyoto (JP)

(72) Inventors: Samuel Reed-Weidner, Lakeside, CA (US); Nai-Wei Su, Irvine, CA (US)

(73) Assignee: OMRON CORPORATION, Kyoto (JP)

( * ) Notice: Subject to any disclaimer, the term of this patent is extended or adjusted under 35 U.S.C. 154(b) by 110 days.

(21) Appl. No.: 18/361,709

(22) Filed: Jul. 28, 2023

(65) Prior Publication Data

US 2025/0033214 A1    Jan. 30, 2025

(51) Int. Cl.
*B25J 9/16*      (2006.01)
*B25J 5/00*      (2006.01)

(52) U.S. Cl.
CPC .......... *B25J 9/1676* (2013.01); *B25J 5/007* (2013.01); *B25J 9/161* (2013.01)

(58) Field of Classification Search
CPC .......... B25J 9/1676; B25J 5/007; B25J 9/161
See application file for complete search history.

(56) References Cited

U.S. PATENT DOCUMENTS

| | | | | |
|---|---|---|---|---|
| 11,880,209 B2 * | 1/2024 | Kwon | | G05D 1/0274 |
| 2006/0041842 A1 * | 2/2006 | Loberg | | G06T 15/00 |
| | | | | 715/700 |
| 2019/0302800 A1 * | 10/2019 | Martens | | G08G 1/166 |
| 2020/0073401 A1 * | 3/2020 | Szatmary | | B60T 7/00 |
| 2021/0260764 A1 * | 8/2021 | Paschall, II | | G05D 1/246 |
| 2021/0303745 A1 * | 9/2021 | Linkowski | | G06F 30/13 |
| 2021/0325874 A1 * | 10/2021 | Schlacks, IV | | G05D 1/692 |

FOREIGN PATENT DOCUMENTS

| | | | | |
|---|---|---|---|---|
| EP | 2952928 A1 | 12/2015 | | |
| EP | 3623894 B1 | 3/2020 | | |
| JP | 2000-062913 A | 2/2000 | | |
| JP | 2019105995 A | * | 6/2019 | |
| JP | 2019-114129 A | 7/2019 | | |
| JP | 2021-062935 A | 4/2021 | | |
| KR | 20220064914 A | * | 5/2022 | ............ B25J 11/008 |

OTHER PUBLICATIONS

International Search Report and Written Opinion for International Application No. PCT/JP2024/024187 dated Sep. 24, 2024.

* cited by examiner

*Primary Examiner* — Khoi H Tran
*Assistant Examiner* — Nhi Q Bui
(74) *Attorney, Agent, or Firm* — Knobbe Martens Olson & Bear LLP

(57) ABSTRACT

Systems and methods for generating safety zones for a mobile robot are described. The systems and methods can include receiving information about a cart or topper to be used on the mobile robot such as a size and number of posts of the cart. The systems and methods can further include generating safety zones based on the type of mobile robot and the information about the cart or topper. The systems and methods can further include operating the mobile robot based on the safety zone such that when an object is detected within the safety zone, a controlled stop of the mobile robot is triggered.

16 Claims, 16 Drawing Sheets

SYSTEMS AND METHODS FOR GENERATING SAFETY ZONES FOR AUTONOMOUS MOBILE ROBOTS

BACKGROUND

Field

Some embodiments described herein relate to systems and methods for generating safety zones for mobile robots, such as autonomous mobile robots.

Description

Mobile robots can be used to perform a wide variety of tasks within a working environment. For example, within a manufacturing facility or warehouse, mobile robots may be used to move materials throughout the working environment. The mobile robots may be used with carts or other toppers that are carried or otherwise moved by the mobile robots. The mobile robots can include one or more sensors that detect an environment in proximity to the mobile robots, and the data provided by the one or more sensors can be used by the mobile robots or a control system to operate the mobile robots in a safe and efficient manner.

SUMMARY

This application provides methods and systems for determining or generating safety zones for mobile robots, such as autonomous mobile robots, guided mobile robots, or human-controlled (e.g., remote controlled mobile robots). In particular, the methods and systems described herein can generate safety zones for mobile robots which take into account and/or are adjusted for carts or other toppers that are carried on or otherwise moved by the mobile robots.

Mobile robots can include one or more sensors for detecting the environment around them. The data provided by the sensors (for example, LiDAR (light detection and ranging) systems) can be used by the mobile robots to determine whether objects in the proximity of the mobile robots pose a collision risk. For a mobile robot, one or more safety zones can be determined that define a boundary or perimeter around the mobile robot. If the mobile robot detects an object within the safety zone (e.g., within the boundary or perimeter associated with safety zone), the mobile robot can automatically perform a controlled stop as quickly as possible.

For a mobile robot, a plurality of safety zones can be determined, with each safety zone associated with a range of different operating conditions, such as speed, direction, rotation, etc. The size and/or shape of each of the plurality of safety zones may be different to suit the associated operating conditions. As an example, a safety zone for a mobile robot traveling at a faster speed may be larger than a safety zone for mobile robot traveling at a slower speed because, at the faster speed, it will take the mobile robot more distance to safely perform a controlled stop. As another example, a safety zone for a mobile robot that is performing a turn (e.g., rotating) may have a shape that is enlarged in the direction towards which the mobile robot is turning so that objects into which the mobile robot might turn can be detected and avoided.

Further, different safety zones (or different pluralities of safety zones) can be determined for different models of mobile robots. This can account for different sizes, speeds, and other factors associated with the different models of mobile robots. Further, different models of mobile robots may include different numbers and/or types of sensors for detecting the surrounding environment. Different safety zones (or different pluralities of safety zones) may be determined for different mobile robots based on the numbers and/or types of sensors included.

As discussed above, the size and shape of a safety zone for a mobile robot is configured to allow sufficient space around the mobile robot, such that, if an object is detected within the safety zone, the mobile robot can perform a controlled stop prior to colliding with the object. In some instances, however, mobile robots may be used in connection with carts or other toppers (such as conveyors, for example) that can be carried on top of the mobile robot. When this occurs, the size and shape of the safety zone must be adjusted to account for the topper. For example, if a topper is used on a mobile robot that overhangs the mobile robot in one or more directions, those over hanging portions may collide with objects, even if the mobile robot itself does not. Thus, there is a need to provide a mechanism for adjusting the safety zones of a mobile robot to account for carts or other toppers that may be carried on the mobile robot.

As described herein, methods and systems for determining or generating safety zones for mobile robots that take into account and/or are adjusted for carts or other toppers that are carried on or otherwise moved by the mobile robots can allow a user to input information about a cart or topper to be used on the mobile robot. This information can be used to generate updated safety zones for the mobile robot that account for the cart or topper. The updated safety zones can then be used by the mobile robot for safe operation.

In some instances, a user is able to enter information relating to the size or length of the overhang of the cart or topper on each side of the mobile robot (e.g., front, back, right, and left). Further, in some instances, the user is able to enter information about the type of mobile robot that while be used. With this information, the methods and systems can determine appropriately sized and configured safety zones for the mobile robot and cart or topper pair.

In some instances, the user is further able to input information about the number, location, and size of one or more posts or legs associated with the cart or topper. The safety zones can be generated to cut out or otherwise account for the posts or legs of the cart or topper.

In a first aspect, a system for generating at least one safety zone for a mobile robot is described. The system can include a processor and a computer-readable memory in communication with the processor, the memory storing instructions that are executable by the processor. The instructions can cause the processor to display a user interface to a user on a display. The user interface can include input fields that allow a user to input: a front overhang associated with a distance in a forward direction that a topper to be used on a mobile robot extends beyond a front edge of the mobile robot; a rear overhang associated with a distance in a rearward direction that the topper to be used on the mobile robot extends beyond a rear edge of the mobile robot; a left overhang associated with a distance in a leftward direction that the topper to be used on the mobile robot extends beyond a left edge of the mobile robot; a right overhang associated with a distance in a rightward direction that the topper to be used on the mobile robot extends beyond a right edge of the mobile robot; and a type of the mobile robot. Based on the front overhang, the rear overhang, the left overhang, the right overhang, and the type of the mobile robot, the instructions can cause the processor to generate at least one safety zone for operation of the mobile robot, the safety zone defining a boundary about the mobile robot within which an object detected by an environmental sensor of the mobile robot will trigger a controlled stop of the mobile robot to avoid a collision with the object.

In some embodiments, the system further includes one or more of the following features in any combination: (a) a communication module, and wherein the instructions further cause the system to transmit the at least one safety zone to the mobile robot, whereby the mobile robot is operated based in part on the at least one safety zone; (b) wherein the at least one safety zone comprises a plurality of safety zones, and the plurality of safety zones comprise one or more safety zones associated with linear motion of the mobile robot, one or more safety zones associated with rotational motion of the mobile robot, and one or more safety zones associated with combined linear and rotational motion of the mobile robot; (c) wherein each of the one or more safety zones associated with linear motion of the mobile robot are further associated with a range of linear speeds, each of the one or more safety zones associated with rotational motion of the mobile robot are associated with a range of rotational speeds, and each of the one or more safety zones associated with combined linear and rotational motion of the mobile robot are associated with a range of linear speeds and a range of rotational speeds; (d) wherein the instructions further cause the system to access a database storing information about a plurality of types of mobile robots, the information including size, linear speed information, rotational speed information, linear deceleration information, rotational deceleration, and environmental sensor information for each of the plurality of types of mobile robot; (e) wherein the at least one safety zone is generated based on the linear speed information, the rotational speed information, the linear deceleration information, the rotational deceleration, and the environmental sensor information associated with the type of mobile robot; (f) wherein the input fields of the user interface further allow a user to input a number of posts associated with the topper, and a position and size associated with each post; (g) wherein the at least one safety zone is generated based on the number, position and size of the posts, and wherein the at least one safety zone includes one or more carve outs from the safety zone associated with each post; (h) wherein the environmental sensor comprises a LiDAR sensor; (i) wherein the at least one safety zone comprises a pair of subzones, each subzone associated with one of a pair of environmental sensors of the mobile robot; and/or other features as described herein.

In another aspect, a method for generating at least one safety zone for a mobile robot can include causing a user interface to be displayed to a user on a display, the user interface comprising input fields that allow a user to input, a front overhang associated with a distance in a forward direction that a topper to be used on a mobile robot extends beyond a front edge of the mobile robot, a rear overhang associated with a distance in a rearward direction that the topper to be used on the mobile robot extends beyond a rear edge of the mobile robot, a left overhang associated with a distance in a leftward direction that the topper to be used on the mobile robot extends beyond a left edge of the mobile robot, a right overhang associated with a distance in a rightward direction that the topper to be used on the mobile robot extends beyond a right edge of the mobile robot, and a type of the mobile robot. The method further includes receiving user inputs of the front overhang, the rear overhang, the left overhang, the right overhang, and the type of mobile robot, and based on the front overhang, the rear overhang, the left overhang, the right overhang, and the type of the mobile robot, generating at least one safety zone for operation of the mobile robot, the safety zone defining a boundary about the mobile robot within which an object detected by an environmental sensor of the mobile robot will trigger a controlled stop of the mobile robot to avoid a collision with the object.

The method can include one or more of the following features in any combination: (a) transmitting, via a communication module, the at least one safety zone to the mobile robot, whereby the mobile robot is operated based in part on the at least one safety zone; (b) wherein the at least one safety zone comprises a plurality of safety zones, and the plurality of safety zones comprise one or more safety zones associated with linear motion of the mobile robot, one or more safety zones associated with rotational motion of the mobile robot, and one or more safety zones associated with combined linear and rotational motion of the mobile robot; (c) wherein each of the one or more safety zones associated with linear motion of the mobile robot are further associated with a range of linear speeds, each of the one or more safety zones associated with rotational motion of the mobile robot are associated with a range of rotational speeds, and each of the one or more safety zones associated with combined linear and rotational motion of the mobile robot are associated with a range of linear speeds and a range of rotational speeds; (d) accessing a database storing information about a plurality of types of mobile robots, the information including size, linear speed information, rotational speed information, linear deceleration information, rotational deceleration, and environmental sensor information for each of the plurality of types of mobile robots; (e) wherein the at least one safety zone is generated based on the linear speed information, the rotational speed information, the linear deceleration information, the rotational deceleration, and the environmental sensor information associated with the type of mobile robot; (f) wherein the input fields of the user interface further allow a user to input a number of posts associated with the topper, and a position and size associated with each post; (g) wherein the at least one safety zone is generated based on the number, position and size of the posts, and wherein the at least one safety zone includes one or more carve outs from the safety zone associated with each post; (h) wherein the environmental sensor comprises a LiDAR; (i) wherein the at least one safety zone comprises a pair of subzones, each subzone associated with one of a pair of environmental sensors of the mobile robot; and/or other features as described herein.

For purposes of this summary, certain aspects, advantages, and novel features of the disclosure have been described. It is to be understood that not necessarily all such advantages may be achieved in accordance with any particular embodiment of the invention. Thus, for example, those skilled in the art will recognize that the invention may be embodied or carried out in a manner that achieves one advantage or group of advantages as taught herein without necessarily achieving other advantages as may be taught or suggested herein.

BRIEF DESCRIPTION OF THE DRAWINGS

Certain embodiments will be discussed in detail with reference to the following figures, wherein like reference numerals refer to similar features throughout. These figures are provided for illustrative purposes and the embodiments are not limited to the specific implementations illustrated in the figures.

DETAILED DESCRIPTION

This disclosure describes various systems, devices, and methods for determining or generating safety zones for mobile robots, such as autonomous mobile robots, guided mobile robots, or human-controlled (e.g., remote controlled mobile robots). In particular, the methods and systems described herein can generate safety zones for mobile robots which take into account and/or are adjusted for carts or other toppers that are carried on or otherwise moved by the mobile robots.

The various features and advantages of the systems, devices, and methods for generating safety zones for mobile robots described herein will become more fully apparent from the following description of the examples illustrated in the figures. These examples are intended to illustrate the principles of this disclosure, and this disclosure should not be limited to merely the illustrated examples. The features of the illustrated examples can be modified, combined, removed, and/or substituted as will be apparent to those of ordinary skill in the art upon consideration of the principles disclosed herein.

Figure 1:
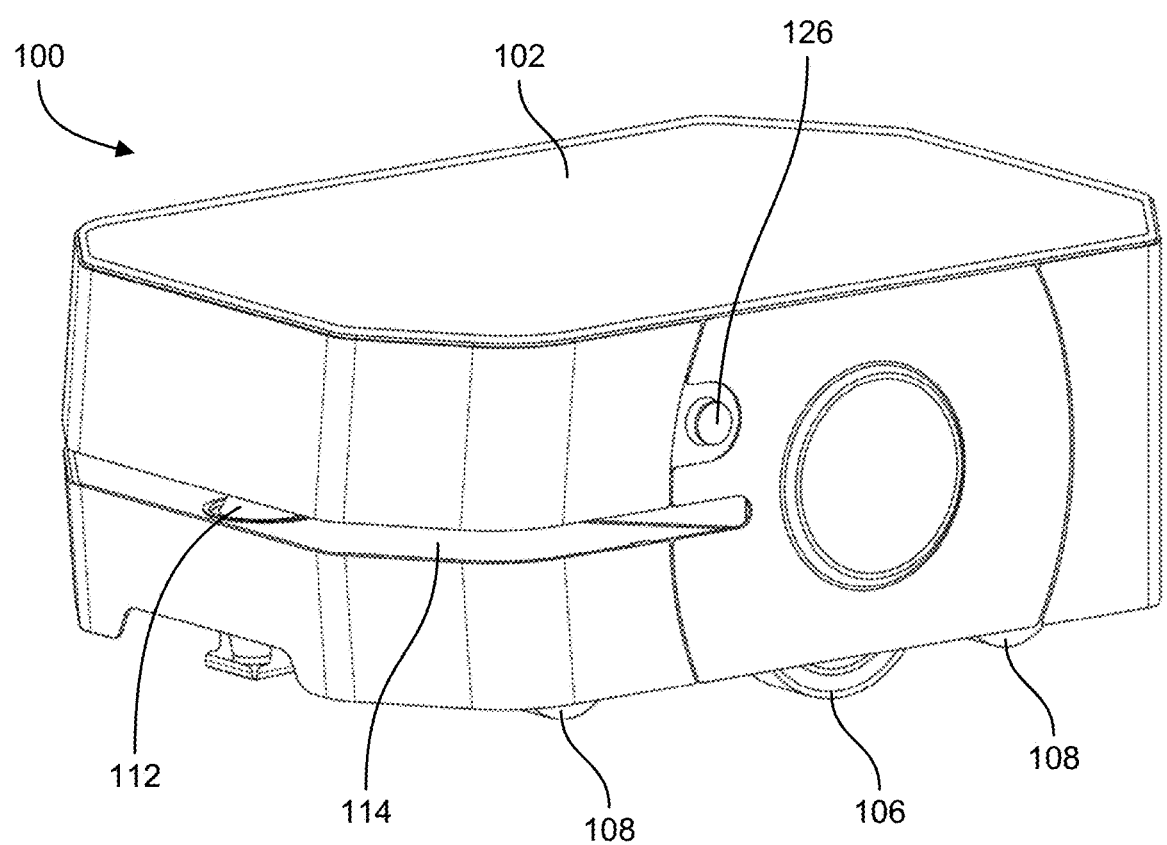
FIG. 1 shows an example embodiment of a mobile robot.
Figure 2:
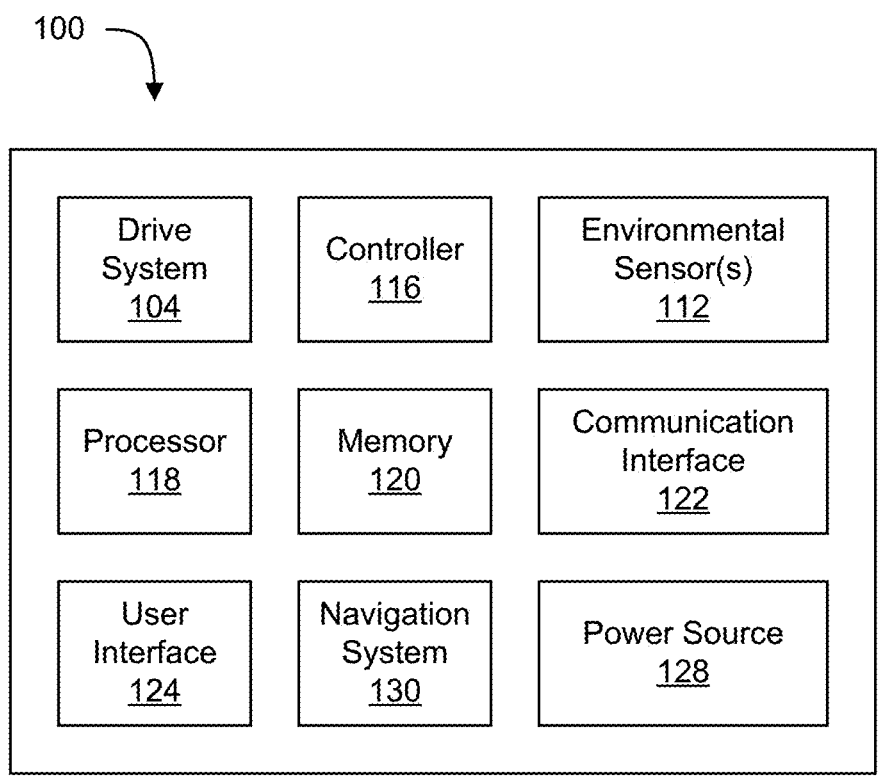
FIG. 2 is a schematic diagram of an example embodiments of a mobile robot.

FIG. 1 shows an example embodiment of a mobile robot 100, and FIG. 2 shows a schematic diagram of the mobile robot 100. The mobile robot 100 can have a chassis or housing 102, which can support various other components of the robot 100. Some components can be disposed inside the housing 102, and some components can be at least partially exposed so that they can interact with entities outside the housing 102. The mobile robot 100 can have a drive system 104, which can be configured to move the mobile robot 100. For example, the mobile robot 100 can have one or more driven wheels 106, which can be driven by at least one motor (not visible in FIG. 1). In some embodiments, two or more driven wheels 106 can be independently driven to cause the mobile robot 100 to move forward, move backward, turn, etc. In some embodiments, a steering mechanism (e.g., a pivoting wheel) can turn the mobile robot 100. In some cases, one or more non-driven wheels 108 can provide support to the robot 100. Various other suitable drive systems can be used, such as tracks or legs.

The mobile robot 100 can have one or more environmental sensors 112, which can be used to sense or measure the environment around the robot 100. The environmental sensor(s) 112 can be a LiDAR (Light Detection and Ranging) system, for example. The environmental sensor(s) 112 can include at least one laser, which can emit laser pulses across a range of angles. The environmental sensor(s) 112 can include a light detector, which can receive light from the laser pulses that are reflected by the environment (e.g., objects) around the mobile robot 100. The received light can be used to determine the location of objects around the mobile robot 100. For example, the direction of the emitted laser pulse and/or the direction of the received light can indicate the direction of the object, and the timing of the emitted laser pulse and/or the received light (e.g., time-of-flight) can indicate the distance of the object from the robot. The housing 102 of the mobile robot 100 can have an opening 114, such as a generally horizontal slit, to permit light to exit and enter the environmental sensor(s) 112 of the mobile robot 100 (e.g., across a range of angles). Various other types of environmental sensors 112 could be used, such a camera, a video analysis system that analyzes video from a camera on the robot 100 to identify objects or other environmental features, a sonar system, and/or a heat sensor, etc. Further, the environmental sensor(s) 112 can be located in other locations on the housing 102 of the mobile robot 100.

As will be discussed in more detail below, the environmental sensor(s) 112 can be associated with a safety zone of the mobile robot 100, such that when the environmental sensor(s) 112 detect an object within the zone of safety, the mobile robot 100 can be configured to perform a controlled stop to avoid collision with the object.

Figure 3:
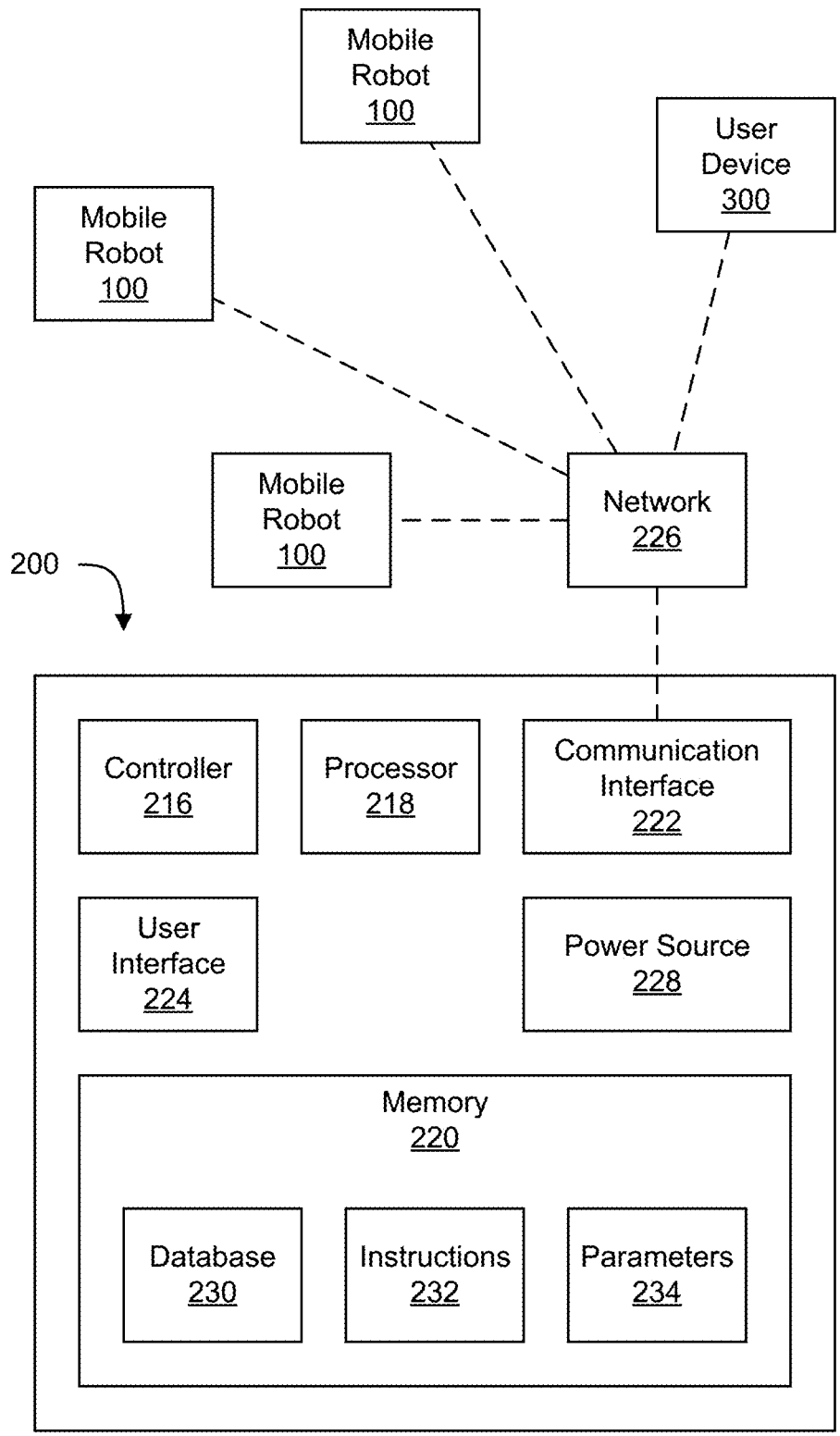
FIG. 3 is a schematic diagram of a mobile robot management system in communication with mobile robots and a user device.

The mobile robot 100 can include a controller 116, which can operate various aspects of the mobile robot 100. For example, the controller 116 can interpret information from the environmental sensor(s) 112, such as to identify objects, determine distances to or locations of objects, operate the drive system 104, perform navigation and/or collision avoidance operations, communicate with the robot management system (e.g., as shown in FIG. 3), or various other features and functions of the mobile robot 100. The controller 116 can be configured to implement a safety system for the mobile robot 100. For example, the controller 116 can receive data related to the movement of the mobile robot 100 and related to objects detected by the environmental sensors 112. This data can be analyzed by the controller 116 to determine whether the mobile robot 100 is operating safely or whether conditions indicate that a controlled stop should be triggered. For example, the controller 116 can detect whether an object is identified within a safety zone of the mobile robot 100 and trigger a controlled stop. In some embodiments, the controller 116 determines a speed of the mobile robot 100 based on encoder data received from a wheel of the mobile robot 100 and determines which of a plurality of safety zones should be used. The various functions of the mobile robot 100 disclosed herein can be implemented by the controller 116, even where the controller 116 is not specifically discussed. In some embodiments, the controller 116 can determine, generate, or apply a safety zone to the output of the environmental sensor(s) 112 to determine whether an object is within the safety zone.

The mobile robot 100 can include at least one processor 118, which can be a hardware processor. The processor 118 can include circuitry configured to execute operations to implement the various functions and features discussed herein. In some embodiments, the mobile robot 100 can include multiple processors 118, and different tasks can be performed by different processors 118. The mobile robot 100 can include memory 120, which can be computer-readable memory (e.g., non-transitory computer-readable memory). The memory 120 can include RAM, ROM, non-volatile memory, flash memory, a hard disc, or any other suitable type of memory. In some embodiments, the mobile robot 100 can include multiple memory components, which can store different types of information or instructions for different functions or features. The memory 120 can include instructions that can be executed by the at least one processor 118 to implement the controller 116 and/or to perform the various functions and features disclosed herein. In some embodiments, the functions and/or features can be implemented by an integrated circuit or other special purpose processor that is specifically configured to perform the functions and features disclosed herein. In some cases, the controller 116 can include a plurality of control modules. Different tasks or functions can be performed by different control modules (e.g., different processors 118 and/or different sets of software instructions).

The mobile robot 100 can include a communication interface 122, which can be used to send information from the robot 100 and/or to receive information from the robot management system or some other external device. The communication interface 122 can be wireless, such as using WiFi, Bluetooth, or any other suitable wireless communication protocol. In some embodiments, the communication interface 122 can include a wired connection. For example, the communication interface 122 can include a port or a plug, which can be configured to connect to a corresponding plug or port that is coupled to an external device, to enable communication therebetween, in some situations. For example, a USB port can be used, although various types of ports or other wired connections could be used. In some cases, a user can couple a laptop, smartphone, or other computer device to the mobile robot 100 via the communication interface for adjusting parameters of the mobile robot 100, for diagnosing issues with the mobile robot 100, for updating features of the mobile robot 100, etc. In some embodiments, the communication interface 122 can be used to communicate information regarding the position and/or trajectory of the mobile robot 100 determined with respect to the mobile robot's map with other mobile robots and/or with a robot management system (for example, as shown in FIG. 3). Similarly, the communication interface 122 can be configured to receive safety zones that are generated by another device.

The mobile robot 100 can include a user interface 124, which can be used to receive input from a user and/or to provide output (e.g., information) to a user. The user interface 124 can include one or more buttons 126, switches, dials, or other user input elements, a touchscreen, a display, one or more lights, a speaker, a microphone, etc. In some cases, a user can provide input to adjust parameters of the mobile robot 100. In some embodiments, the user interface 124 may allow input of information from which safety zones for the mobile robot 100 can be determined.

The mobile robot 100 can include a power source 128, which can be a battery. The battery can be rechargeable, and the mobile robot 100 can be configured to dock with a recharging station for regarding the battery (e.g., through an electrical interface). The power source 128 can provide electrical power to operate the drive system 104 (e.g., one or more electric motors), the various sensors and controllers and other systems disclosed herein. The power source 128 can provide DC or AC power, and any suitable type of power source 128 could be used.

The mobile robot 100 can include a navigation system 130. The navigation system 130 can be used to perform path finding for the mobile robot 100. The navigation system 130 can receive a destination and/or one or more waypoints, such as from the user interface 124 or the communication interface 122. The navigation system 130 can receive environmental information (e.g., object locations) from the environmental sensor 112, and can use that information to determine trajectory information to navigate the mobile robot 100 (e.g., towards a destination). The trajectory information can include a path or route, such as from the robot's current location to the target location (e.g., task location or other destination or waypoint). In some cases, the navigation system 130 can determine intermediate waypoints based on the environmental information. In some embodiments, the navigation system 130 can modify the trajectory information while the mobile robot 100 is moving. For example, if an object moves or a new object is detected (e.g., by the environment sensor 112), the navigation system 130 can determine to change the path or route of the mobile robot 100. In some embodiments, the navigation system 130 is configured to perform a controlled stop if an object is detected within a zone of safety of the mobile robot 100.

FIG. 3 shows a schematic diagram of a mobile robot management system 200, which can manage a fleet of mobile robots 100. In FIG. 3, three mobile robots 100 are shown, but any suitable number of robots 100 can be managed by the system 200, such as 2, 4, 8, 12, 20, 30, 40, 50 robots or more, or any values or ranges between these numbers. The robot management system 200 can manage robots in a factory, office, hospital, retail store, warehouse, or any other suitable facility, such as that has task to be performed by robots 100 at various locations. The robot management system 200 can include a controller 216, which can operate various aspects of the robot management system 200, as described herein.

The robot management system 200 can include at least one processor 218, which can be a hardware processor. The processor 218 can include circuitry configured to execute operations to implement the various functions and features discussed herein, such as the systems and methods for determining map transformations between robots. In some embodiments, the robot management system 200 can include multiple processors 218, and different tasks can be performed by different processors 218. The robot management system 200 can include memory 220, which can be computer-readable memory (e.g., non-transitory computer-readable memory). The memory 220 can include RAM, ROM, non-volatile memory, flash memory, a hard disc, or any other suitable type of memory. In some embodiments, the robot management system 200 can include multiple memory components, which can store different types of information or instructions for different functions or features. The memory 220 can include instructions that can be executed by the at least one processor 218 to implement the controller 216 and/or to perform the various functions and features of the management system 200. In some embodiments, the functions and/or features of the robot management system 200 can be implemented by an integrated circuit or other special purpose processor that is specifically configured to perform the functions and features disclosed herein. In some cases, the controller 216 can include a plurality of control modules. Different tasks or functions can be performed by different control modules (e.g., different processors 218 and/or different sets of software instructions).

The robot management system 200 can include a communication interface 222, which can be used to send information from the robot management system 200 to the robots 100 and/or to other systems or devices. The communication interface 222 can receive information from the robots 100 and/or other systems or devices. The communication interface 222 can be a wireless communication interface, such as using WiFi, Bluetooth, or any other suitable wireless communication protocol. In some embodiments, the communication interface 222 can include a wired connection. For example, the communication interface 222 can include a port or a plug, which can be configured to connect to a corresponding plug or port that is coupled to an external device, to enable communication therebetween, in some situations. For example, a USB port can be used, although various types of ports or other wired connections could be used. In some cases, a user can couple a laptop, smartphone, or other computer device to the robot management system 200 via the communication interface for adjusting parameter 234 of the robot management system 200, for diagnosing or troubleshooting issues, for updating features of the robot management system 200, etc. The robot management system 200 can communicate with the robots 100 and/or other systems or devices over a network 226, which can be a wireless network, such as a WiFi network. The network 226 can be a shared network that communicates other types of information as well as information relating to management of the fleet of robots 100. In some embodiments, the network 226 can be a dedicated network, which can be used exclusively for operating the fleet of robots. In some embodiments, the communication interface 22 can be used to communicate information regarding the position and/or trajectory of the mobile robots 100 determined with respect to the individual mobile robot's map with other mobile robots. Similarly, the communication interface 222 can be configured to communicate safety zone information to the mobile robots 100.

The robot management system 200 can communicate with an external system or device, such as a user device 300, over the network 226, or in any other suitable manner. The user device 300 can be a user terminal or other computing device at a workstation or other location in the facility that uses the fleet of robots. For example, the user device 300 can be at a computer at a factory workstation, at an office workstation, a nurse workstation, a patient room, a point-of-sale station, a manager desk or office, etc. The user device 300 can be mobile user device, such as a smartphone, a tablet computer, etc. The user device 300 can send tasks to the robot management system 200 to be assigned to the robots 100. In some cases, multiple user devices 300 can be used. One or more of the user devices 300 can be located at the environment with the mobile robots 100 or can be remote to the environment with the mobile robots 100 (e.g., communicating over the internet or some other wide area network). The user device 300 can be used to provide inputs from which safety zones can be determined.

The robot management system 200 can include a user interface 224, which can be used to receive input from a user and/or to provide output (e.g., information) to a user. The user interface 224 can include one or more buttons, switches, dials, or other user input elements, a keyboard, a touchscreen, a display, one or more lights, a speaker, a microphone, etc. In some cases, a user can provide input to adjust parameter of the robot management system 200 via the user interface 224, or via the user device 300. In some embodiments, the user interface 224 can be used to input data that will be used to generate updated safety zones that account for a cart or topper to be used on the mobile robot 100.

The robot management system 200 can include a power source 228, which can be a wired power connection (e.g., configured to plug into an outlet). In some cases, a battery (e.g., rechargeable) can be used. The power source 228 can provide electrical power to operate the robot management system 200 as disclosed herein. The power source 228 can provide DC or AC power, and any suitable type of power source 228 could be used.

Figure 4:
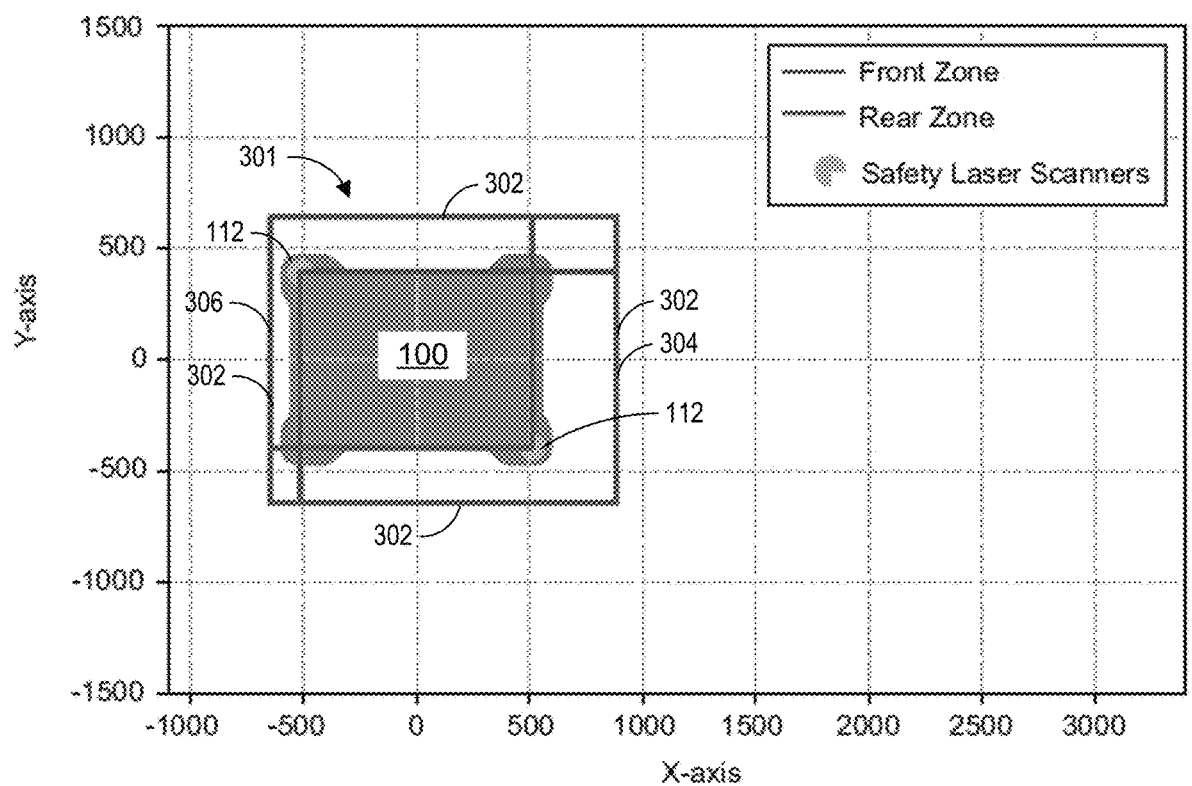
FIG. 4 illustrates an example safety zone for a mobile robot.

FIG. 4 illustrates an example safety zone 301 for a mobile robot 100. As shown, in this example, the mobile robot 100 includes two environmental sensors 112 (referred to as safety laser scanners in FIG. 4), which are configured to detect objects within a field of view of each environmental sensor 112. As described above, the environmental sensors 112 can be, for example, LiDAR sensors. In the illustrated example, the mobile robot 100 includes a first environmental sensor 112 on a first corner and a second environmental sensor 112 on a second corner, substantially opposite to the first environmental sensor. This configuration provides the mobile robot 100 with the capability of sensing objects on all sides of the mobile robot 100 (e.g., front, back, right, and left). Other positions, placements, and numbers of environmental sensors 112 can be used in other embodiments.

With continued reference to FIG. 4, the two environmental sensors 112 together provide the safety zone 301 around the mobile robot 100. In this example, the safety zone 301 surrounds the mobile robot 100, extending on all sides of the mobile robot 100. The safety zone 301 includes an outer periphery or boundary 302, which is offset from all sides of the mobile robot 100. When the environmental sensors 112 detect an object within the boundary 302, the mobile robot 100 is caused to perform a controlled stop so as to not collide with the object.

In the example of FIG. 4, the safety zone 301 comprises two discrete subzones 304, 306. Each subzone 304, 306 is provided by one of the environmental sensors 112. The pair of subzones 304, 306, together form the safety zone 301 around the mobile robot 100. In the illustrated embodiment, the subzones 304, 306 overlap at two corners of the mobile robot 100. Overlap of the subzones 304, 306 is not necessary in all embodiments.

FIG. 4 illustrates the safety zone 301 extending around the mobile robot 100 on an X-Y axis with units of millimeters and an origin at the center of the mobile robot 100. As will be described in the following figures, the shape and size of the safety zone 301 can vary depending on the operating characteristics of the mobile robot 100. Thus, FIG. 4 illustrates only one example of a safety zone 301 in order to understand its basic principles.

Figure 5:
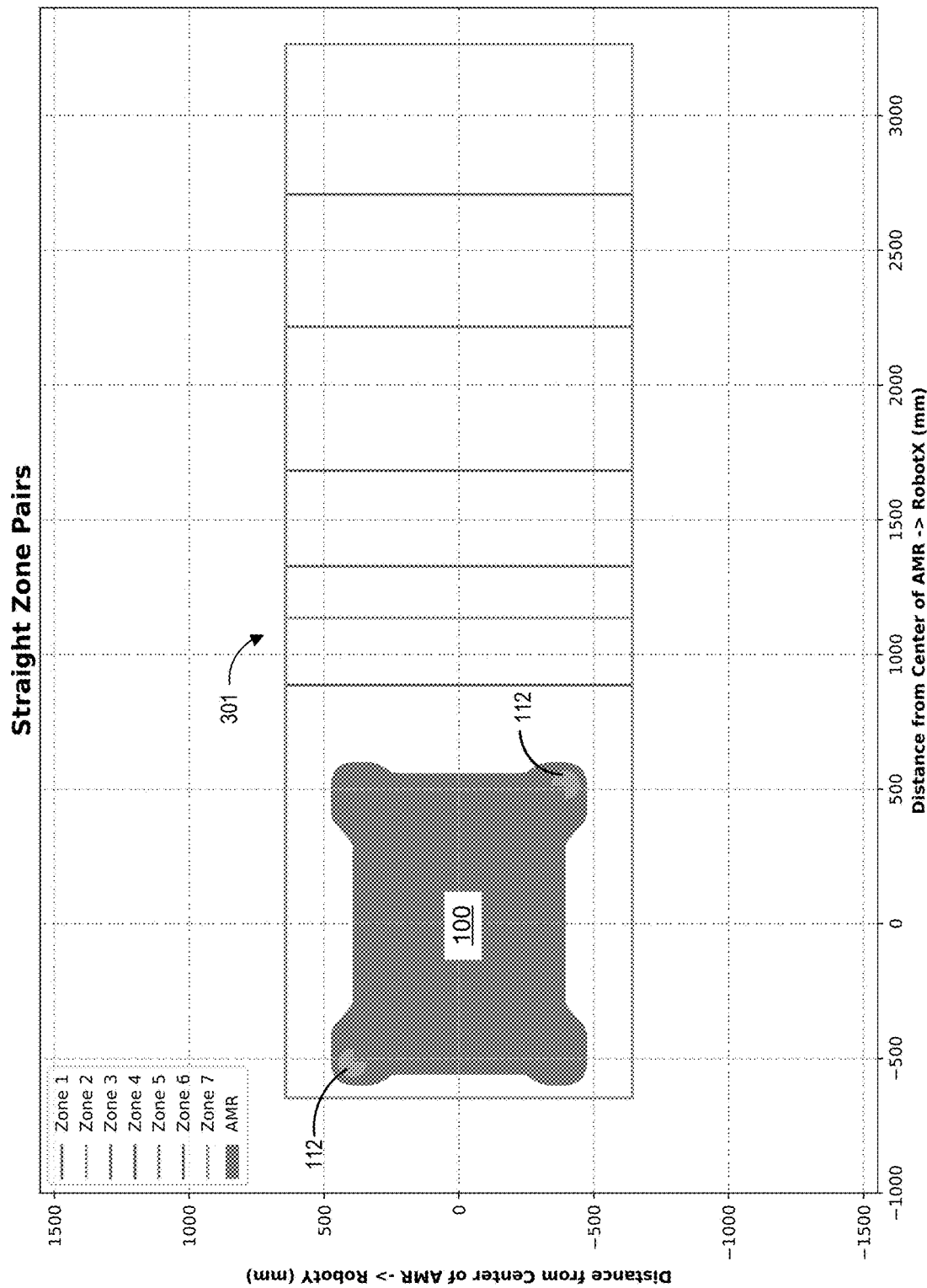
FIG. 5 illustrates a plurality of safety zones for a mobile robot that can be associated with linear motion of the mobile robot.

FIG. 5 illustrates a plurality of safety zones 301 for a mobile robot 100. In the illustrated example, seven different safety zones 301 are illustrated. In this example, only the outer boundaries of the safety zones 301 are illustrated, but the safety zones 301 may each comprise a pair of subzones associated with the two environmental sensors 112 as described above with reference to FIG. 4. The seven safety zones 301 of FIG. 5 can be associated with straight line motion (e.g., forward motion) of the mobile robot 100. As shown, the safety zones 301 increase in size in a direction in front of the mobile robot 100 from zone 1 to zone 7. Zone 1 can be associated with a slower speed of the mobile robot 100, and zone 7 can be associated with a faster speed of the mobile robot 100, and the intermediary zones 2-6 can each be associated with different speeds between the slower and faster speeds. The differently sized safety zones 301, can allow for the increased stopping distance that will be necessary when the mobile robot 100 is operated at higher speeds. That is, the safety zone 301 should extend in front of the mobile robot 100 to a greater distance when the mobile robot 100 is moving faster because it will take the mobile robot 100 a greater distance to stop due to the increased speed. Notably, FIG. 5 illustrates safety zones 301 associated with straight line motion in the forward direction. Similarly, safety zones 301 can be generated associated with straight line motion in the reverse direction. Also, the sizes and numbers of the safety zones 301 illustrated in FIG. 5 are provided by way of example only and may vary depending on the configuration of the mobile robot 100. For example, the sizes and numbers of the safety zones 301 can be chosen based on the speed and deceleration of the mobile robot 100.

In some embodiments, the shape and size of the safety zones 301 associated with straight line motion can be determined based on a maximum translation velocity of the mobile robot 100 associate with the zone, the response time of the mobile robot 100 (e.g., how quickly can the mobile robot 100 detect an object and trigger an action), a safety factor, and a maximum translation deceleration value (indicative of the stopping power of the robot). In general, as the maximum translational velocity of the mobile robot 100 increases, the safety zone 301 to the object in the direction of travel also increases as shown to provide additional stopping distance so as to avoid collisions with objects.

Figure 6:
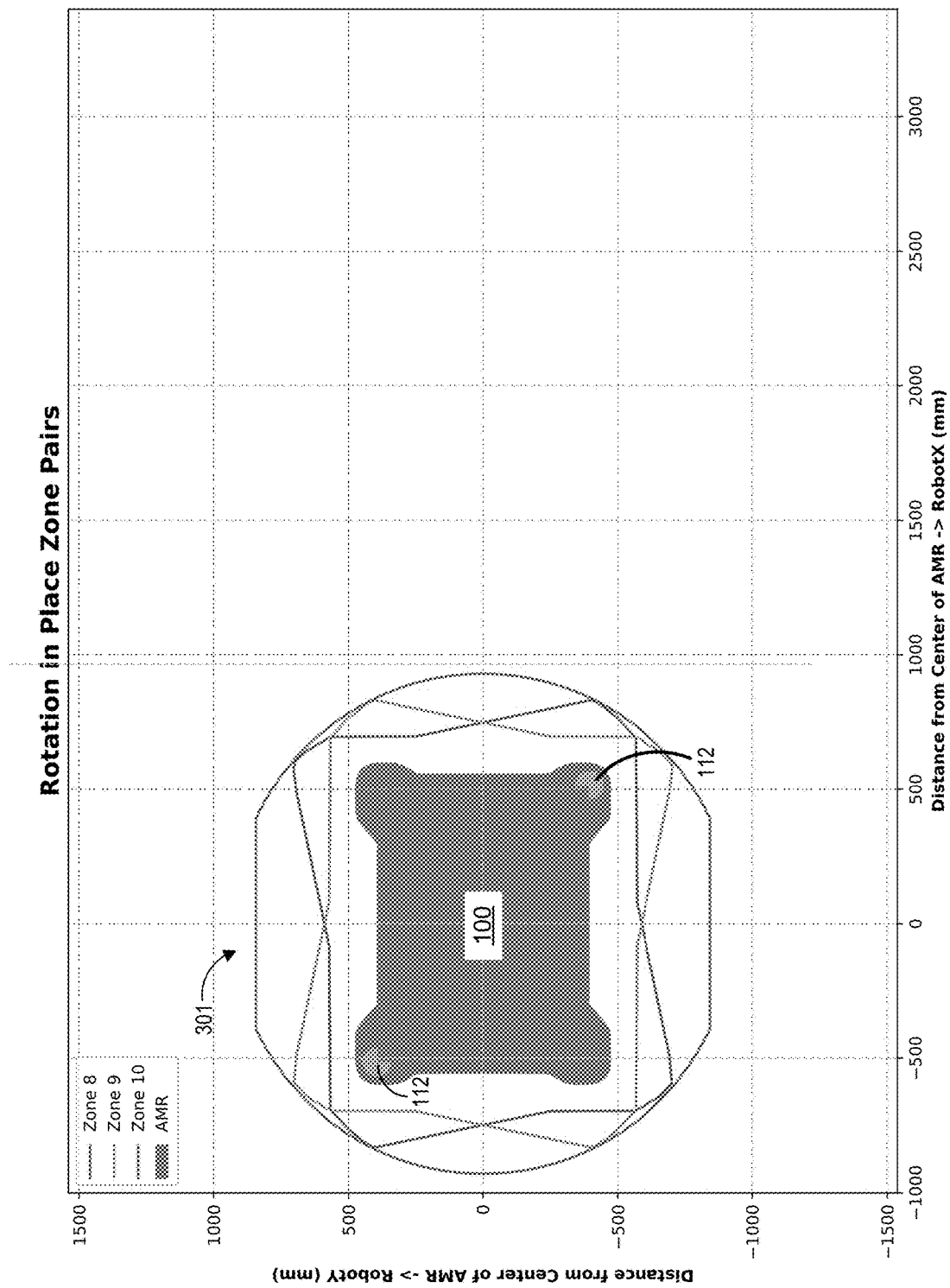
FIG. 6 illustrates an additional plurality of safety zones for a mobile robot that can be associated with rotational motion of the mobile robot.

FIG. 6 illustrates an additional plurality of safety zones 301 for a mobile robot 100. In the illustrated example, three different safety zones 301 are illustrated. In this example, only the outer boundaries of the safety zones 301 are illustrated, but the safety zones 301 may each comprise a pair of subzones associated with the two environmental sensors 112 as described above with reference to FIG. 4. The three safety zones 301 of FIG. 6 can be associated with rotational motion of the mobile robot 100, for example, when the mobile robot 100 is rotating in place and/or with a slower translation velocity (e.g., a translational velocity less than 100 mm/s). Zones 8 and 9 can be associated with lower rotational velocities, but for rotation in opposite directions (clockwise and counterclockwise). When rotating at slower speeds, the size of the safety zones 301 of zones 8 and 9 can be smaller. In the illustrate example, zones 8 and 9 can be built by taking a geometric union through a path that a simplified robot (e.g., a rectangle defined by the maximum bounds of the robot) would stop along (including the response time), which is run for both positive and negative translational velocity. The safety zone 301 indicated as zone 10 can be associated with faster rotation of the robot, and thus provides a bigger boundary around the mobile robot 100. In this example, the geometric union process of the stopping path is run 4 times and a geometric union of those resulting profiles is taken. From this polygon, the maximum radius from the center of the robot is determined and a circle is created. The geometry of zone 10 is this circle with the top and bottom portion cut off of it. The cut off sections are defined by taking the minimum and maximum Y-value of the polygon of the geometric union of the four original profiles. The specific safety zones 301 associated with rotational motion (zones 8-10) illustrated in FIG. 6 are provided by way of example, and different numbers, sizes, and shapes of safety zones 301 associated with rotational motion can be included in other embodiments.

Figure 7A:
FIGS. 7A and 7B each illustrate a plurality of safety zones for a mobile robot that can be associated with left-banking and right-banking motion of the mobile robot.
Figure 7B:

FIGS. 7A and 7B each illustrate a plurality of safety zones 301 for a mobile robot 100. In the illustrated examples, eleven different safety zones 301 are illustrated for each of FIG. 7A (zones 11-21) and FIG. 7B (zones 22-32). In these examples, only the outer boundaries of the safety zones 301 are illustrated, but the safety zones 301 may each comprise a pair of subzones associated with the two environmental sensors 112 as described above with reference to FIG. 4. The safety zones of FIGS. 7A and 7B can be associated with banking motions of the mobile robot 100, where the mobile robot 100 is both moving translationally and turning. FIG. 7A illustrates zones 11-21 that are associated with left-banking motion, and FIG. 7B illustrates zones 22-32 associated with right-banking motion. As shown, the shape of each safety zone extends both in front of the mobile robot 100 and in the direction of the banking turn. The increasing sizes of the safety zones can be associated with increasing speeds, to allow additional stopping distance as described previously. In the illustrated examples, the shape of the safety zones 301 of FIGS. 7A and 7B can be defined based on the following parameters: the angle traveled, is the rotational velocity, the maximum translation velocity for the zone, the response time for the mobile robot 100, a safety factor, the maximum translation deceleration, and the maximum rotational deceleration. The specific safety zones 301 associated with banking motion (zones 11-32) illustrated in FIGS. 7A and 7B are provided by way of example, and different numbers, sizes, and shapes of safety zones 301 associated with banking motion can be included in other embodiments.

FIGS. 5-7B have illustrated a plurality of safety zones 301 for a mobile robot 100 for various operating conditions, such as straight-line motion, rotation in place motion, and banking motion, with different safety zones also associated with different speeds of the mobile robot 100. In use, the mobile robot 100 operates with a different one of these safety zones 301 based on the current operating characteristics of the mobile robot 100 (e.g., the current translational and/or rotational velocity and type of motion). In this way, the mobile robot 100 can operate using an appropriate zone based on the operating characteristics. As noted above, different numbers and/or shapes of safety zones 301 can be used.

FIGS. 4-7B have described safety zones 301 with respect to a mobile robot 100 that includes sufficient environmental sensors 112 such that the mobile robot 100 can detect objects on all sides thereof. In some embodiments, some mobile robots 100 may include only sufficient environmental sensors 112 for detecting objects on some of the sides of the mobile robot, for example, only in front of the mobile robot 100. Accordingly, in some embodiments, the safety zones do not fully surround the mobile robot 100.

Figure 8A:
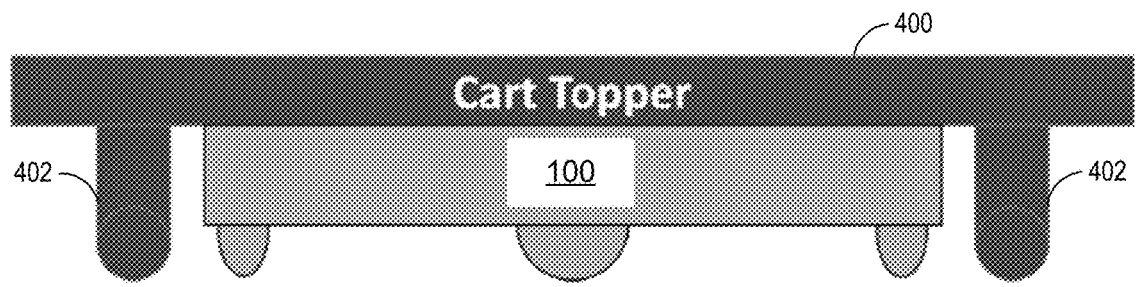
FIGS. 8A and 8B provide side and top views of a mobile robot in use with a cart or other topper.
Figure 8B:
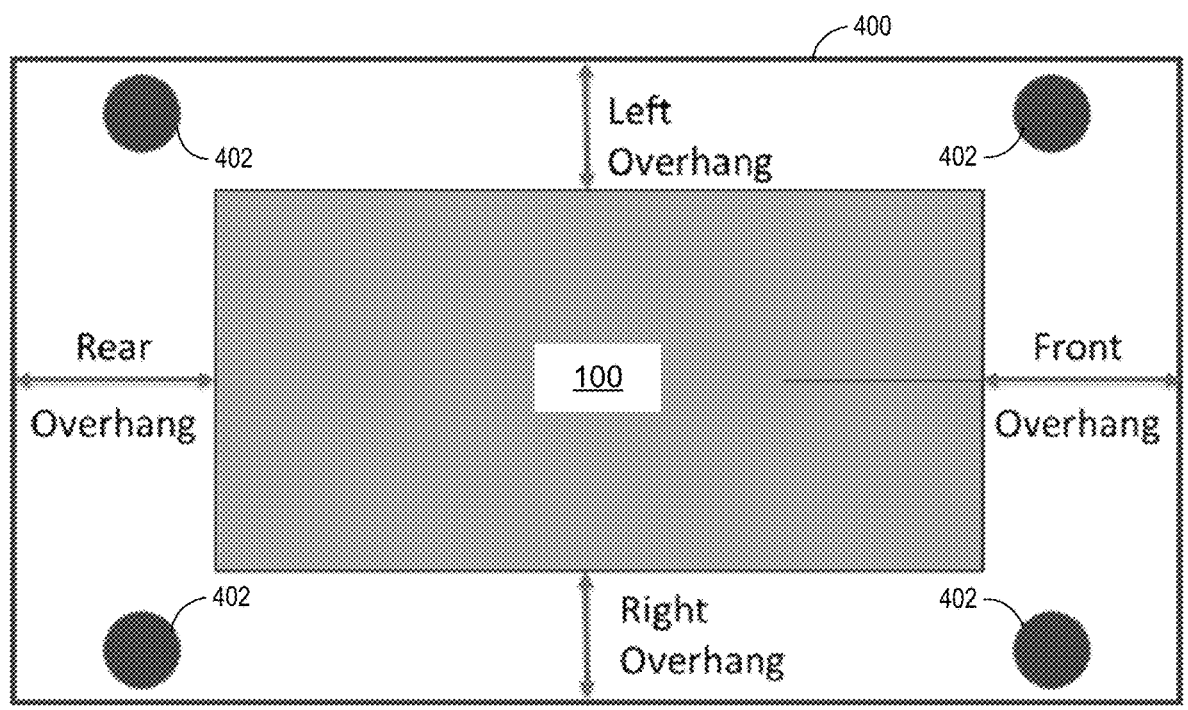

FIGS. 8A and 8B provide side and top views of a mobile robot 100 in use with a cart 400 (or other topper). In some instances, the mobile robot 100 can be configured to carry and move a cart 400 or other topper on an upper surface thereof. As shown in FIG. 8A, the mobile robot 100 can be configured to be positioned below the cart 400. The cart 400 can include one or more support posts 402. As shown in FIG. 8B, the cart 400 can overhang the mobile robot with a front overhang, a rear overhang, a right overhang, and a left overhang. As shown in FIGS. 8A and 8B, in some instances, the cart 400 or other topper can overhang the mobile robot 100 in one or more directions. Notably, if the mobile robot 100 is operated using the safety zones 301 previously described with reference to FIGS. 4-7B, the overhanging portions of the cart 400 or other topper may collide with objects because the overhanging portions of the cart 400 or topper are not accounted for by the safety zone. Thus, it can be desirable to modify the safety zones 301 of the mobile robot 100 to account for the size and shape of the cart 400 or other topper in order to allow the mobile robot 100 to operate safely with the cart of other topper.

Figure 9:
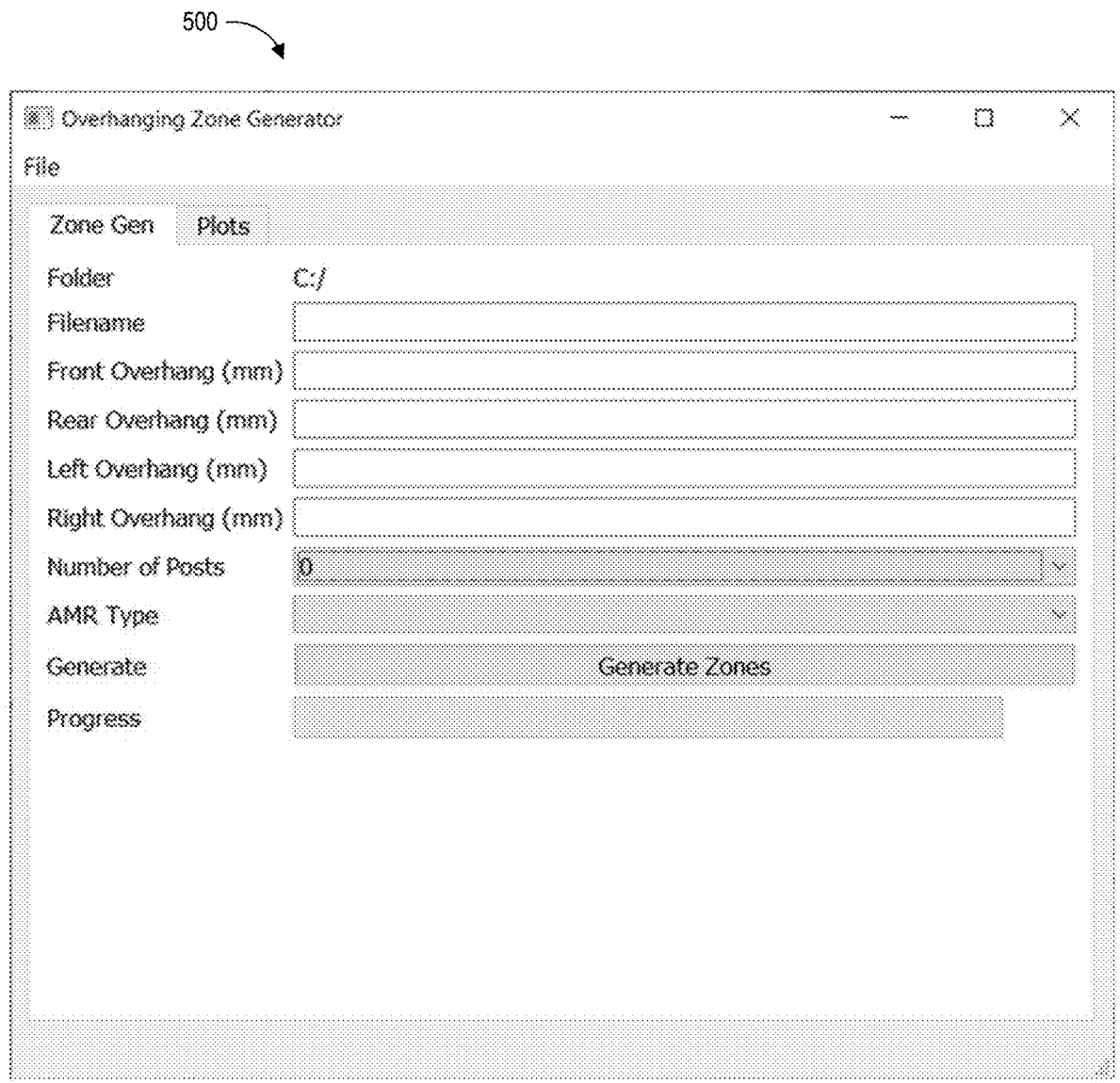
FIG. 9 illustrates an example tool that can allow for the creation of safety zones that can account for the cart or other topper in a simple and efficient manner.

FIG. 9 illustrates an example tool 500 that can allow for the creation of safety zones that can account for the cart 400 (or other topper) in a simple and efficient manner. In the illustrated example, the tool 500 comprises a user interface that allows a user to enter information about the cart 400 and the mobile robot 100. The tool 500 then uses the entered information to generate new safety zones that account for the cart 400. Once generated, the new safety zones can be uploaded or otherwise communicated to the mobile robot 100 for use by the mobile robot 100.

As shown in FIG. 9, in the illustrated example, the tool 500 allows for a user to enter values for a front overhang, a rear overhang, a left overhang, and a right overhang. In some embodiments, these values can be obtained through the use of a computer aided design (CAD) software. For example, a CAD model of the cart 400 and a CAD model of the mobile robot 100 can be used to determine the overhangs. In other embodiments, these values can be obtained by positioning the cart 400 on the mobile robot 100 and measuring the distances beyond the boundaries of the mobile robot 100 that the cart extends in the front, rear, left, and right directions. In some instances, these distances are measured by hand and input into the tool 500.

FIG. 9 also illustrates that in some examples, a user can select a type of mobile robot 100 that is being used with the cart 400, as indicated by the AMR type (automated mobile robot type) field. The tool 500 can be configured to access a database of different mobile robot types, which includes information about the size and operating characteristics (e.g., translational and rotational speeds, translational and rotational deceleration speeds, and numbers and positions of environmental sensors 112.

In some examples, with the overhang information input into the tool 500 and the type of mobile robot 100 selected, a user may generate new safety zones that account for the cart 400 by selecting the generate zones button. The new zones will be generated to account for the size of the cart 400. In some embodiments, a plurality of zones can be generated that correspond to the straight-line motion, rotational motion, and banking motions at different speeds described above; however, these zones will be enlarged to account for the increased size of the cart.

In FIG. 9, the tool 500 further includes an input that allows the user to enter a number of posts 402 associated with the cart 400. It can be important to account for the posts 402 of the cart 400 when generating the updated safety zones, as the posts 402 will likely be positioned within the safety zones and thus detectable as objects by the environmental sensors 112. Thus, the posts can be considered static intrusions within the safety zones that must be carved out in order to allow the mobile robot 100 to operate.

Figure 10:
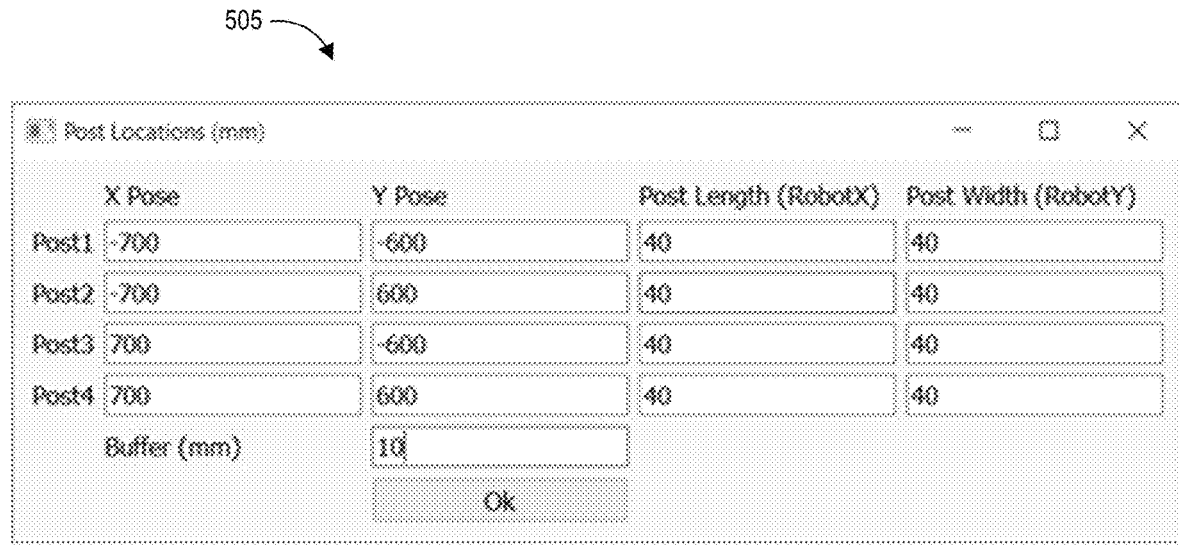
FIG. 10 illustrates a panel that can be associated with the tool to allow the user to input information about the sizes and locations of the posts such that the posts can be accounted for in generating the safety zones.
Figure 11:
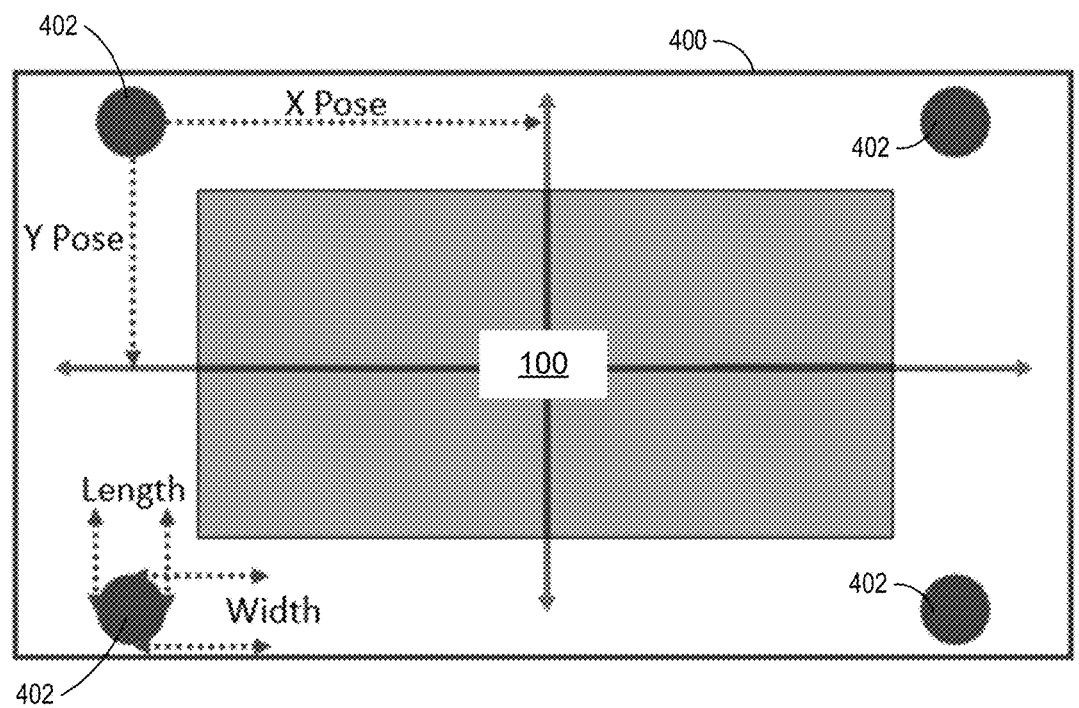
FIG. 11 illustrates examples measurements of post positions and sizes.

FIG. 10, illustrates a panel 505 that can be associated with the tool 500 to allow the user to input information about the sizes and locations of the posts 402 such that the posts can be accounted for in generating the safety zones. The panel 505 can be presented to the user after the user enters a number of posts in the tool of FIG. 9. As shown, in the illustrated embodiment, the panel 505 allows the user to enter the X and Y position of each of the posts. The X and Y position of the posts can be entered with respect to the origin of the mobile robot 100 (for example, as shown in FIG. 11). The panel 505 can also allow the user to enter a length and width for each of the posts. The length and width can be measured, for example, as shown in FIG. 11. In this way, each post can be approximated as rectangle having an input length and width and located at an X, Y location with respect to the origin of the robot. FIG. 10 also illustrates that, in some instances, the user may be configured to enter a buffer to account for tolerancing, measuring, or positioning errors. In some embodiments, the buffer is used to increase the entered length and width of the posts.

With the information about the posts 402 input into the panel 505 of the tool 500, the tool may then generate the safety zones. In some instances, as a first step, the tool 500 can be configured to generate the required cut-outs so that the static intrusions of the posts 402 can be carved out from the safety zones. This can include, for example, determining which posts 402 can be seen by each environmental sensor. For example, in some embodiments, each environmental sensor includes a 270-degree field of view and thus can only view or detect some of the posts 402. Next, a carve out is created from the environmental sensor the vertices (e.g., the outer edges) of the posts 402. This can include determining an angle to each vertex with respect to the environmental sensor. In some embodiments, next, the vertices with the minimum and maximum angle along with the closest other vertex are used to define a polygon to which will be used to remove the static intrusions caused by the post 402. This is shown in FIG. 11, in which different line types are used to illustrate the cutouts as provided by the different environmental sensors 112.

Figure 12:
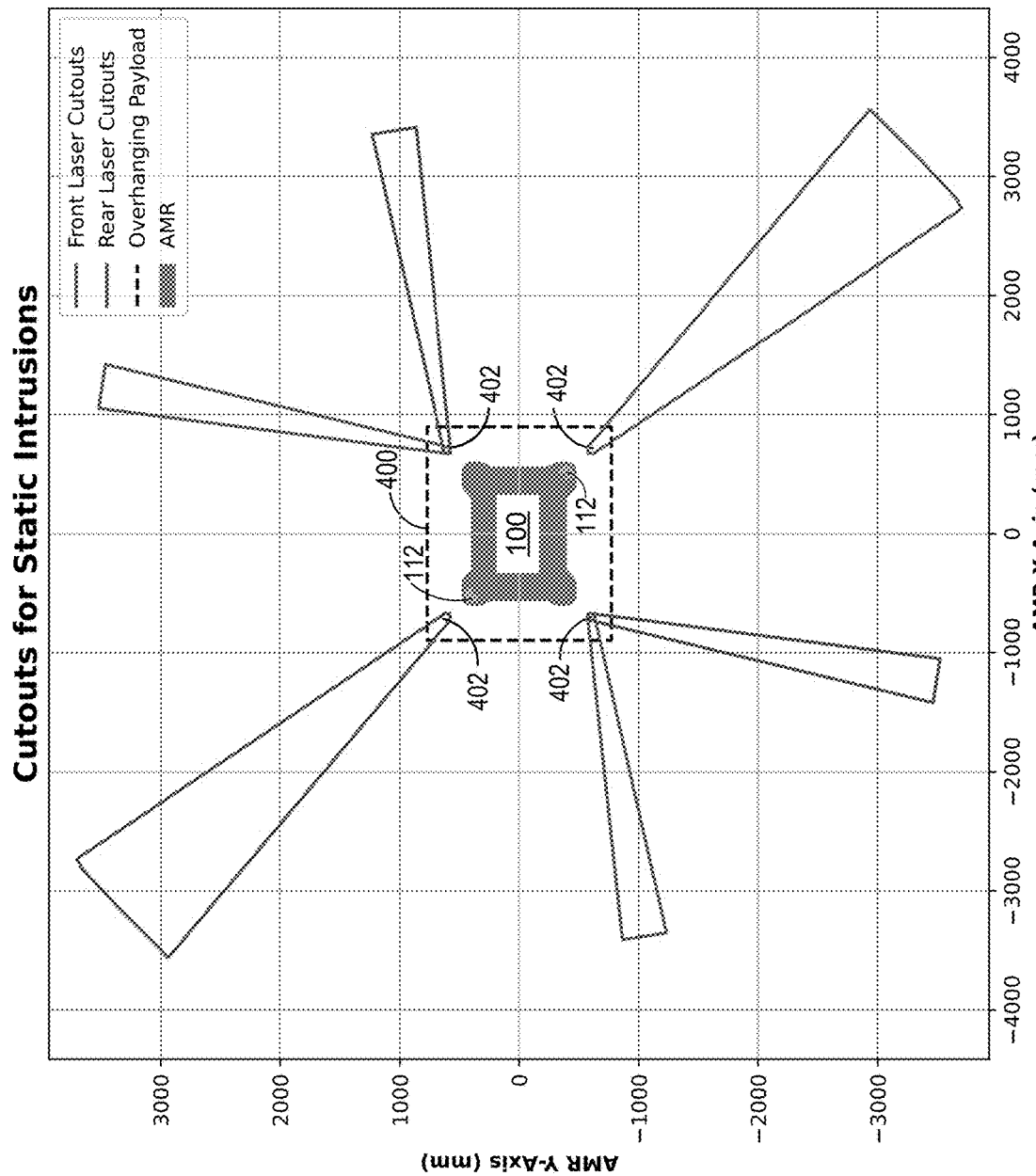
FIG. 12 illustrate cutouts created for posts of a cart.

With the cutouts for the posts 402 determined, new safety zones can be generated that correspond to the various safety zones described above with reference to FIGS. 4-7B, except that these are further based on the increased size of the cart 400 is input by the measured overhangs and the cutouts determined with reference to FIGS. 10-12 are removed.

Figure 13:
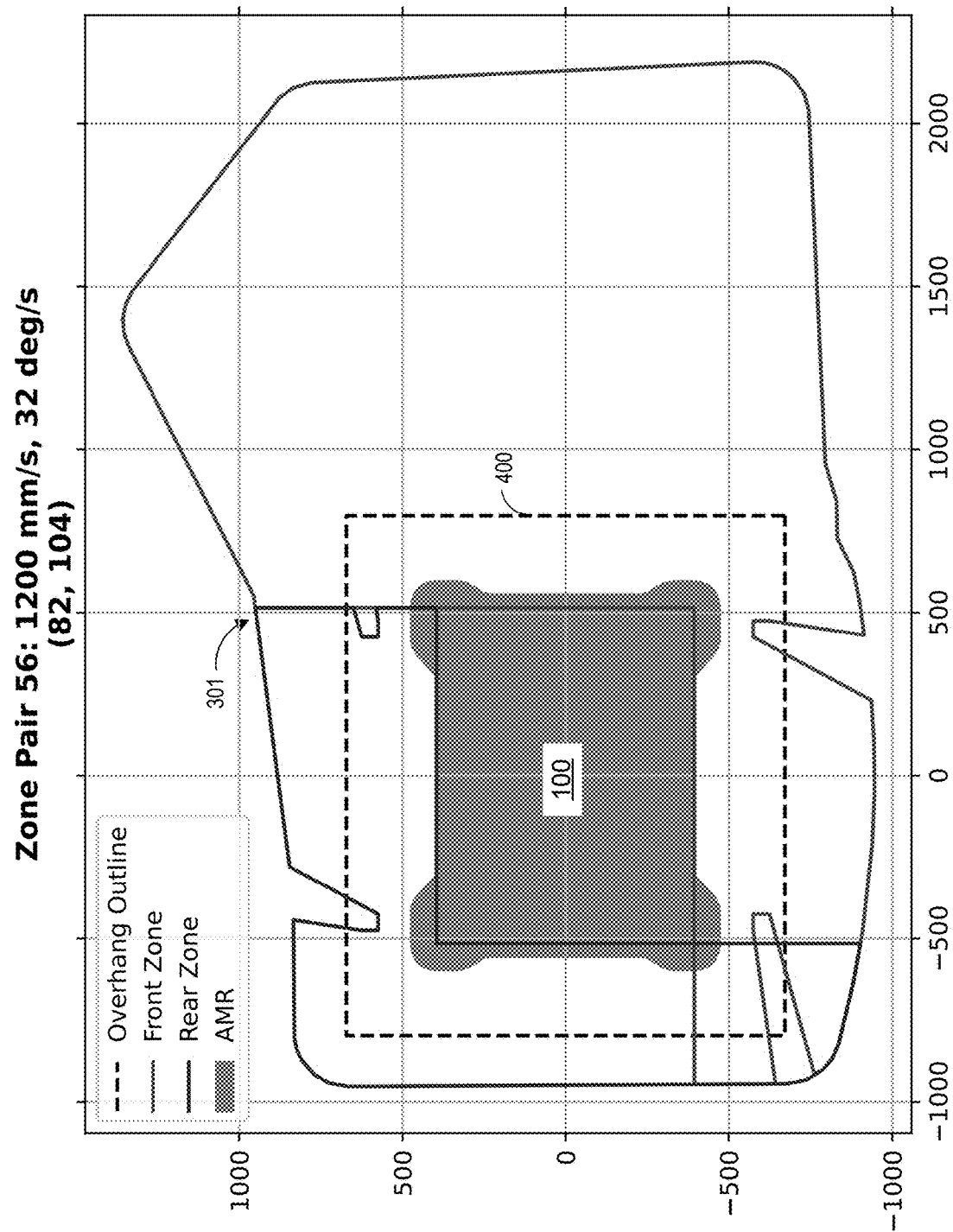
FIG. 13 illustrates a first example modified safety zone for a cart with four posts.
Figure 14:
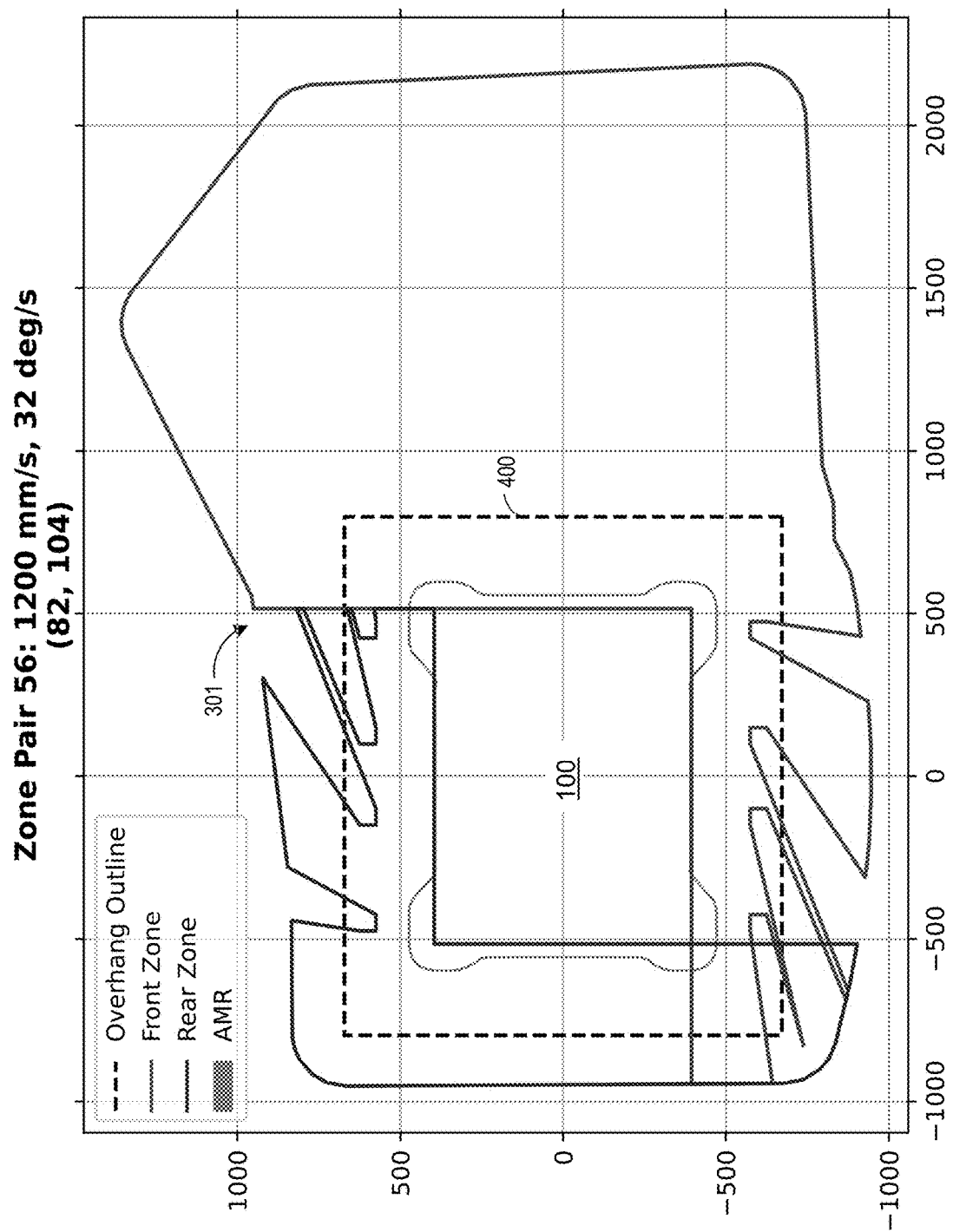
FIG. 14 provides a similar example but includes eight posts.
Figure 15:
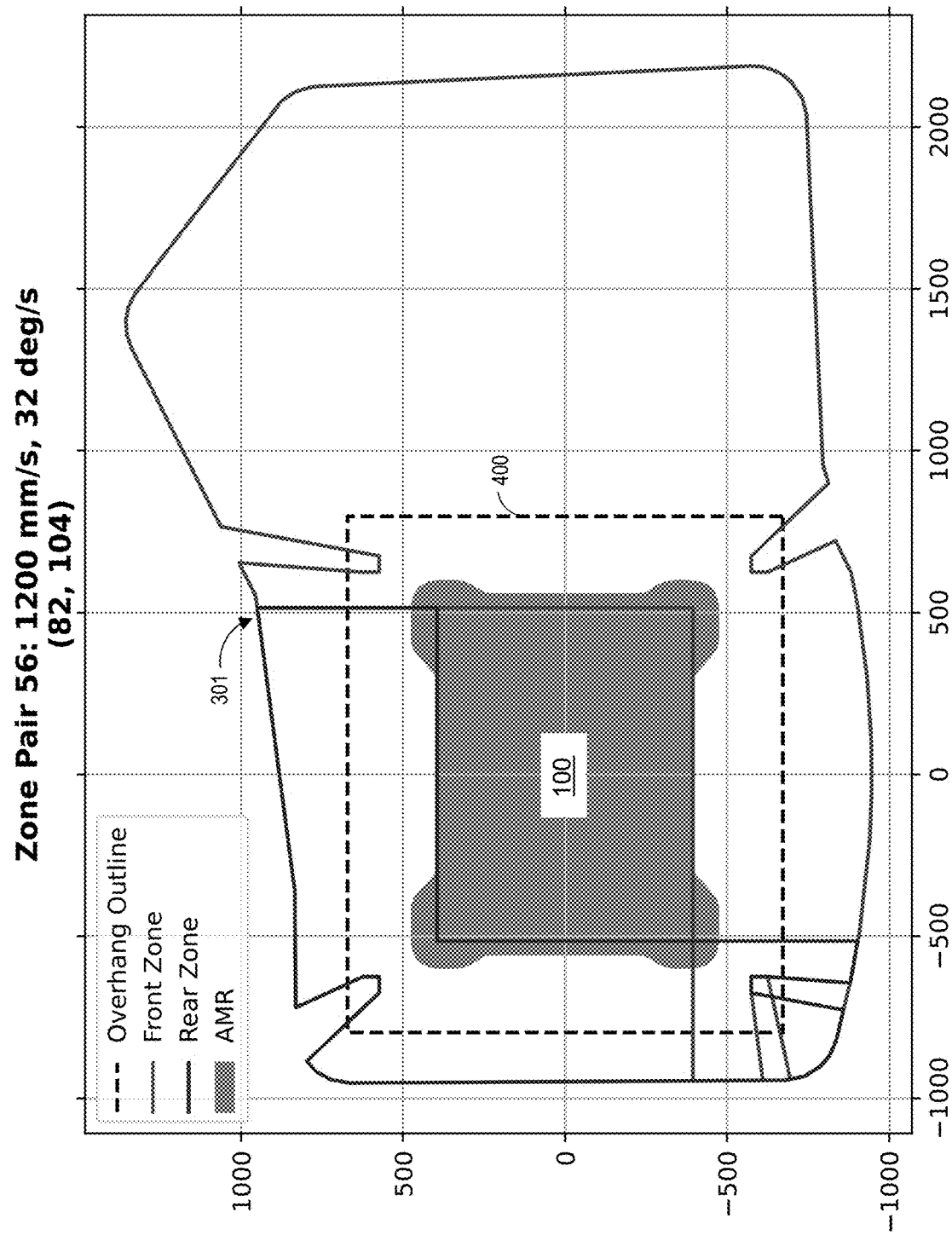
FIG. 15 illustrates another example for a cart with four posts in different positions.

Example updated safety zones 301 that account for the cart 400 and posts 402 are shown in FIGS. 13-15. FIGS. 13-15 provide only some examples, and other sizes and shapes of the safety zones can be determined, for example, corresponding to each of the safety zones 301 shown and described with reference to FIGS. 5-7B for the different types of motions and speeds of the mobile robot 100.

FIG. 13 illustrates a first example modified safety zone 301. As shown, the safety zone includes a periphery or boundary that surrounds the cart 400 and cut outs for the four posts of the cart 400. FIG. 14 provides a similar example but includes eight posts. FIG. 15 provides a similar example, including four posts at different positions than the four posts shown in FIG. 13.

Figure 16:
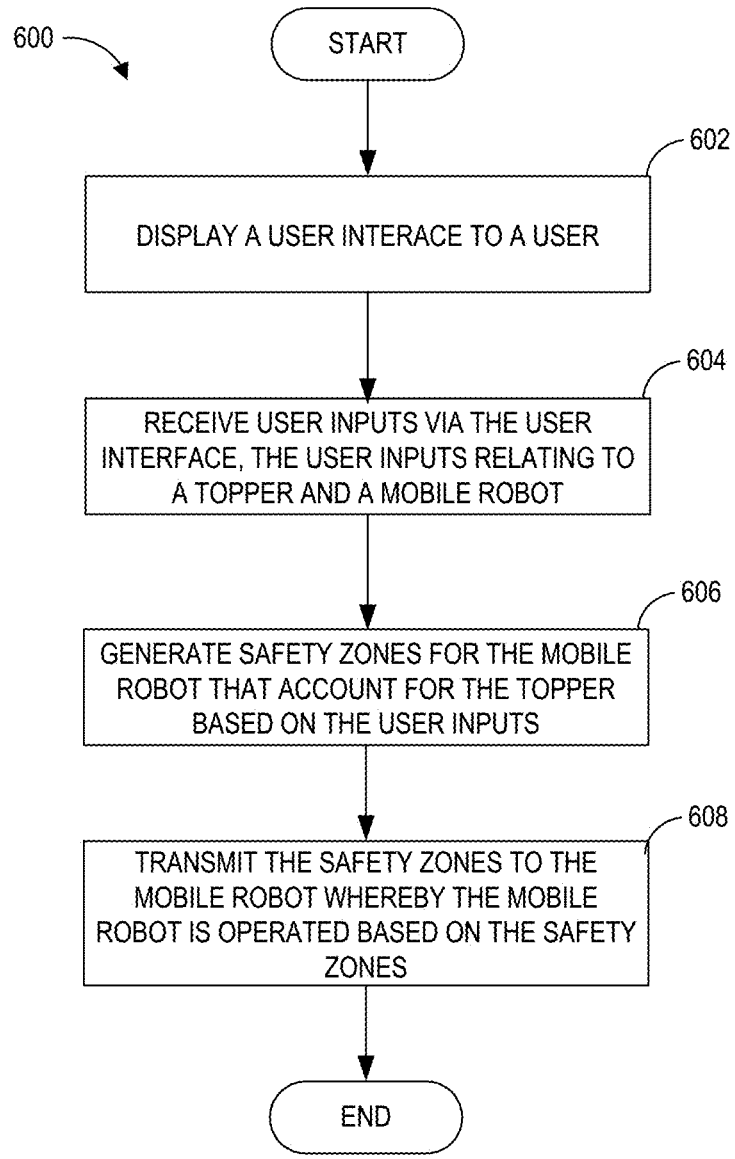
FIG. 16 illustrates an example method for generating safety zones for a mobile robot.

FIG. 16 illustrates an example method 600 for generating safety zones for a mobile robot. The method 600 begins at step 602 where a user interface is displayed to a user. The user interface can include the tool 500 described above. In some embodiment, the user interface includes input fields that allow a user to input: a front overhang associated with a distance in a forward direction that a topper to be used on a mobile robot extends beyond a front edge of the mobile robot; a rear overhang associated with a distance in a rearward direction that the topper to be used on the mobile robot extends beyond a rear edge of the mobile robot; a left overhang associated with a distance in a leftward direction that the topper to be used on the mobile robot extends beyond a left edge of the mobile robot; a right overhang associated with a distance in a rightward direction that the topper to be used on the mobile robot extends beyond a right edge of the mobile robot; and a type of the mobile robot.

At block 604, the method includes receiving user inputs of the front overhang, the rear overhang, the left overhang, the right overhang, and the type of mobile robot. The user can determine the various overhangs, for example, by measuring as described above with reference to FIGS. 10 and 11. In some embodiments, the method 600 may further include accessing a database storing information about a plurality of types of mobile robots, the information including size, linear speed information, rotational speed information, linear deceleration information, rotational deceleration, and environmental sensor information for each of the plurality of types of mobile robots. This information can be retrieved based on the type of mobile robot entered at block 602. In some embodiments, the input fields of the user interface further allow a user to input a number of posts associated with the topper, and a position and size associated with each post.

At block 606, the method can include generating safety zones for the mobile robot. For example, block 602 can include, based on the front overhang, the rear overhang, the left overhang, the right overhang, and the type of the mobile robot, generating at least one safety zone for operation of the mobile robot, the safety zone defining a boundary about the mobile robot within which an object detected by an environmental sensor of the mobile robot will trigger a controlled stop of the mobile robot to avoid a collision with the object. In some embodiments, the safety zones are further generated based on the linear speed information, the rotational speed information, the linear deceleration information, the rotational deceleration, and the environmental sensor information associated with the type of mobile robot.

In some embodiments, the safety zones comprise one or more safety zones associated with linear motion of the mobile robot, one or more safety zones associated with rotational motion of the mobile robot, and/or one or more safety zones associated with combined linear and rotational motion of the mobile robot. In some embodiments, each of the one or more safety zones associated with linear motion of the mobile robot are further associated with a range of linear speeds. In some embodiments, each of the one or more safety zones associated with rotational motion of the mobile robot are associated with a range of rotational speeds. In some embodiments, each of the one or more safety zones associated with combined linear and rotational motion of the mobile robot are associated with a range of linear speeds and a range of rotational speeds. In some embodiments, the safety zones are further generated based on the number, position and size of the posts so that the safety zones include one or more carve outs from the safety zone associated with each post.

At block 608, the method can include transmitting, via a communication module, the safety zones to the mobile robot, whereby the mobile robot is operated based in part on the at least one safety zone.

In some embodiments, the methods, techniques, microprocessors, and/or controllers described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination thereof. The instructions can reside in RAM memory, flash memory. ROM memory, EPROM memory, EEPROM memory, registers, hard disk, a removable disk, a CD-ROM, or any other form of a non-transitory computer-readable storage medium. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

The microprocessors or controllers described herein can be coordinated by operating system software. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

The microprocessors and/or controllers described herein may implement the techniques described herein using customized hard-wired logic, one or more ASICs or FPGAs, firmware and/or program logic which causes microprocessors and/or controllers to be a special-purpose machine. According to one embodiment, parts of the techniques disclosed herein are performed a controller in response to executing one or more sequences instructions contained in a memory. Such instructions may be read into the memory from another storage medium, such as storage device. Execution of the sequences of instructions contained in the memory causes the processor or controller to perform the process steps described herein. In alternative embodiments, hard-wired circuitry may be used in place of or in combination with software instructions.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the techniques described herein may be implemented in analog circuitry or mixed analog and digital circuitry.

Unless the context clearly requires otherwise, throughout the description and the claims, the words "comprise." "comprising." "include," "including." and the like are to be construed in an inclusive sense, as opposed to an exclusive or exhaustive sense; that is to say, in the sense of "including, but not limited to." The words "coupled" or connected," as generally used herein, refer to two or more elements that can be either directly connected, or connected by way of one or more intermediate elements. Additionally, the words "herein," "above." "below," and words of similar import, when used in this application, shall refer to this application as a whole and not to any particular portions of this application. Where the context permits, words in the Detailed Description using the singular or plural number can also include the plural or singular number, respectively. The words "or" in reference to a list of two or more items, is intended to cover all of the following interpretations of the word: any of the items in the list, all of the items in the list, and any combination of the items in the list. All numerical values provided herein are intended to include similar values within a range of measurement error.

Although this disclosure contains certain embodiments and examples, it will be understood by those skilled in the art that the scope extends beyond the specifically disclosed embodiments to other alternative embodiments and/or uses and obvious modifications and equivalents thereof. In addition, while several variations of the embodiments have been shown and described in detail, other modifications will be readily apparent to those of skill in the art based upon this disclosure. It is also contemplated that various combinations or sub-combinations of the specific features and aspects of the embodiments may be made and still fall within the scope of this disclosure. It should be understood that various features and aspects of the disclosed embodiments can be combined with, or substituted for, one another in order to form varying modes of the embodiments. Any methods disclosed herein need not be performed in the order recited. Thus, it is intended that the scope should not be limited by the particular embodiments described above.

Conditional language, such as, among others, "can," "could," "might." or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. Any headings used herein are for the convenience of the reader only and are not meant to limit the scope.

Further, while the devices, systems, and methods described herein may be susceptible to various modifications and alternative forms, specific examples thereof have been shown in the drawings and are herein described in detail. It should be understood, however, that the disclosure is not to be limited to the particular forms or methods disclosed, but, to the contrary, this disclosure covers all modifications, equivalents, and alternatives falling within the spirit and scope of the various implementations described. Further, the disclosure herein of any particular feature, aspect, method, property, characteristic, quality, attribute, element, or the like in connection with an implementation or embodiment can be used in all other implementations or embodiments set forth herein. Any methods disclosed herein need not be performed in the order recited. The methods disclosed herein may include certain actions taken by a practitioner; however, the methods can also include any third-party instruction of those actions, either expressly or by implication.

Any ranges disclosed herein also encompass any and all overlap, sub-ranges, and combinations thereof. Language such as "up to," "at least," "greater than," "less than," "between," and the like includes the number recited. Numbers preceded by a term such as "about" or "approximately" include the recited numbers and should be interpreted based on the circumstances (e.g., as accurate as reasonably possible under the circumstances, for example ±5%, ±10%, ±15%, etc.). For example, "about 3.5 mm" includes "3.5 mm." Phrases preceded by a term such as "substantially" include the recited phrase and should be interpreted based on the circumstances (e.g., as much as reasonably possible under the circumstances). For example, "substantially constant" includes "constant."

What is claimed is:

1. A system for generating at least one safety zone for a mobile robot, the system comprising:
    a processor; and
    computer-readable memory in communication with the processor, the memory storing instructions that are executable by the processor to cause the system to:
        display a user interface to a user on a display, the user interface comprising input fields that allow a user to input:
            a front overhang associated with a distance in a forward direction that a topper to be used on a mobile robot extends beyond a front edge of the mobile robot;
            a rear overhang associated with a distance in a rearward direction that the topper to be used on the mobile robot extends beyond a rear edge of the mobile robot;
            a left overhang associated with a distance in a leftward direction that the topper to be used on the mobile robot extends beyond a left edge of the mobile robot;
            a right overhang associated with a distance in a rightward direction that the topper to be used on the mobile robot extends beyond a right edge of the mobile robot;
            a type of the mobile robot
            a number of posts associated with the topper; and
            a position and size associated with each post; and
        based on the front overhang, the rear overhang, the left overhang, the right overhang, the type of the mobile robot, and the number, position and size of the posts, generate at least one safety zone for operation of the mobile robot, the safety zone defining a boundary about the mobile robot within which an object detected by an environmental sensor of the mobile robot will trigger a controlled stop of the mobile robot to avoid a collision with the object, wherein the at least one safety zone includes one or more carve outs from the safety zone associated with each post.

2. The system of claim 1, further comprising a communication module, and wherein the instructions further cause the system to transmit the at least one safety zone to the mobile robot, whereby the mobile robot is operated based in part on the at least one safety zone.

3. The system of claim 1, wherein the at least one safety zone comprises a plurality of safety zones, and the plurality of safety zones comprise:
one or more safety zones associated with linear motion of the mobile robot;
one or more safety zones associated with rotational motion of the mobile robot; and
one or more safety zones associated with combined linear and rotational motion of the mobile robot.

4. The system of claim 3, wherein:
each of the one or more safety zones associated with linear motion of the mobile robot are further associated with a range of linear speeds;
each of the one or more safety zones associated with rotational motion of the mobile robot are associated with a range of rotational speeds; and
each of the one or more safety zones associated with combined linear and rotational motion of the mobile robot are associated with a range of linear speeds and a range of rotational speeds.

5. The system of claim 1, wherein the instructions further cause the system to:
access a database storing information about a plurality of types of mobile robots, the information including size, linear speed information, rotational speed information, linear deceleration information, rotational deceleration, and environmental sensor information for each of the plurality of types of mobile robots.

6. The system of claim 5, wherein the at least one safety zone is generated based on the linear speed information, the rotational speed information, the linear deceleration information, the rotational deceleration, and the environmental sensor information associated with the type of mobile robot.

7. The system of claim 1, wherein the environmental sensor comprises a LiDAR sensor.

8. The system of claim 1, wherein the at least one safety zone comprises a pair of subzones, each subzone associated with one of a pair of environmental sensors of the mobile robot.

9. A method for generating at least one safety zone for a mobile robot, the method comprising:
causing a user interface to be displayed to a user on a display, the user interface comprising input fields that allow a user to input:
a front overhang associated with a distance in a forward direction that a topper to be used on a mobile robot extends beyond a front edge of the mobile robot;
a rear overhang associated with a distance in a rearward direction that the topper to be used on the mobile robot extends beyond a rear edge of the mobile robot;
a left overhang associated with a distance in a leftward direction that the topper to be used on the mobile robot extends beyond a left edge of the mobile robot;
a right overhang associated with a distance in a rightward direction that the topper to be used on the mobile robot extends beyond a right edge of the mobile robot;
a type of the mobile robot;
a number of posts associated with the topper; and
a position and size associated with each post;
receiving user inputs of the front overhang, the rear overhang, the left overhang, the right overhang, the type of mobile robot, the number of posts, and the position and size associated with each post; and
based on the front overhang, the rear overhang, the left overhang, the right overhang, the type of the mobile robot, the number of posts, and the position and size associated with each post, generating at least one safety zone for operation of the mobile robot, the safety zone defining a boundary about the mobile robot within which an object detected by an environmental sensor of the mobile robot will trigger a controlled stop of the mobile robot to avoid a collision with the object, wherein the at least one safety zone includes one or more carve outs from the safety zone associated with each post.

10. The method of claim 9, further comprising transmitting, via a communication module, the at least one safety zone to the mobile robot, whereby the mobile robot is operated based in part on the at least one safety zone.

11. The method of claim 9, wherein the at least one safety zone comprises a plurality of safety zones, and the plurality of safety zones comprise:
one or more safety zones associated with linear motion of the mobile robot;
one or more safety zones associated with rotational motion of the mobile robot; and
one or more safety zones associated with combined linear and rotational motion of the mobile robot.

12. The method of claim 11, wherein:
each of the one or more safety zones associated with linear motion of the mobile robot are further associated with a range of linear speeds;
each of the one or more safety zones associated with rotational motion of the mobile robot are associated with a range of rotational speeds; and
each of the one or more safety zones associated with combined linear and rotational motion of the mobile robot are associated with a range of linear speeds and a range of rotational speeds.

13. The method of claim 9, further comprising:
accessing a database storing information about a plurality of types of mobile robots, the information including size, linear speed information, rotational speed information, linear deceleration information, rotational deceleration, and environmental sensor information for each of the plurality of types of mobile robots.

14. The method of claim 13, wherein the at least one safety zone is generated based on the linear speed information, the rotational speed information, the linear deceleration information, the rotational deceleration, and the environmental sensor information associated with the type of mobile robot.

15. The method of claim 9, wherein the environmental sensor comprises a LiDAR sensor.

16. The method of claim 9, wherein the at least one safety zone comprises a pair of subzones, each subzone associated with one of a pair of environmental sensors of the mobile robot.

* * * * *